INVENTOR
Richard FELDKÄMPER
By his ATTORNEYS

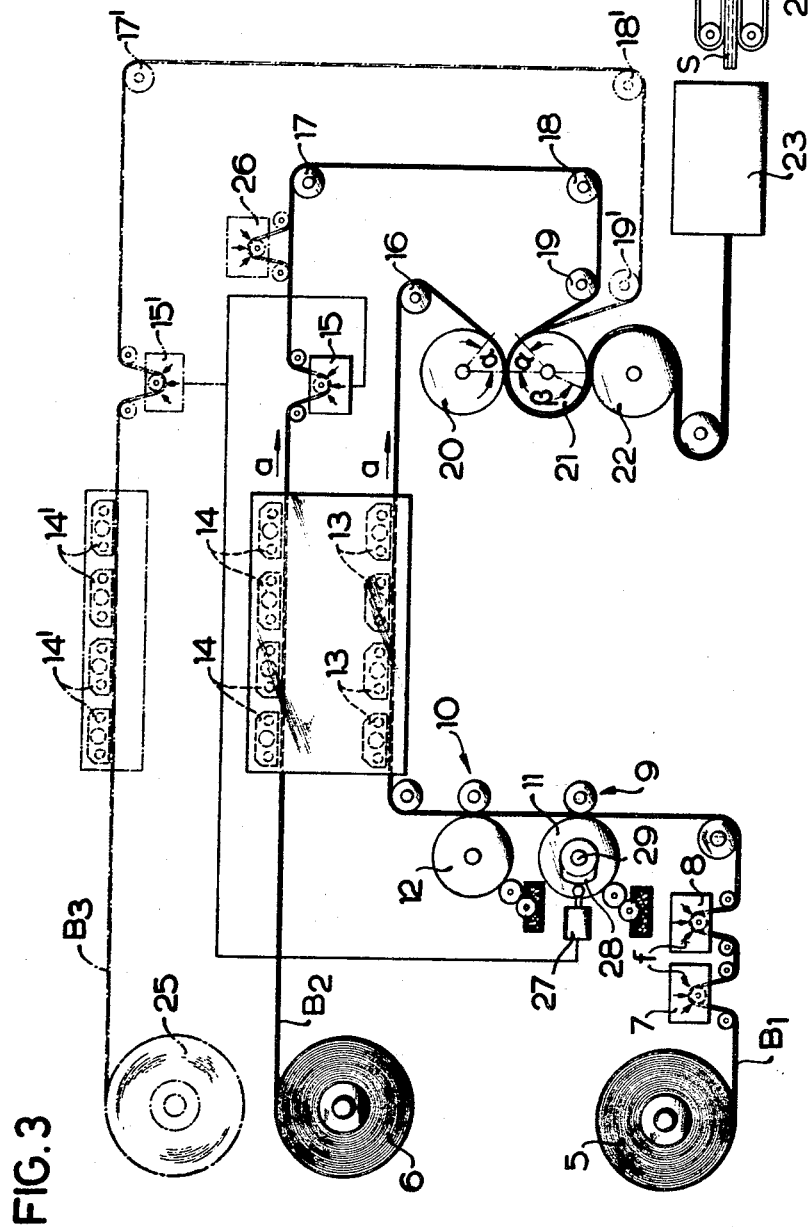

United States Patent Office 3,669,802
Patented June 13, 1972

3,669,802
APPARATUS FOR MANUFACTURING A MULTI-PLY TUBE SECTION CONSISTING OF AT LEAST TWO WEBS OF PLASTICS MATERIAL SHEETING AND INTENDED FOR USE IN THE MANUFACTURING OF BAGS
Richard Feldkamper, Lengerich, Westphalia, Germany, assignor to Windmoller & Holscher, Westphalia, Germany
Filed Mar. 24, 1969, Ser. No. 809,841
Claims priority, application Germany, Mar. 25, 1968, W 41,937; Aug. 16, 1968, P 17 86 095.6
Int. Cl. B32b 1/00
U.S. Cl. 156—387    10 Claims

ABSTRACT OF THE DISCLOSURE

An imprint is to be provided on one of the sheeting surfaces defining an interface between the plies. One of the webs of plastics material sheeting is subjected to a known surface-activating treatment on one surface so that the same is adapted to be printed upon. Said surface is provided with the desired imprint, which is subsequently thermally dried and cooled thereafter. The other sheeting web or webs is or are heat-treated to cause it or them to assume a condition which corresponds as closely as possible to the condition of the printed sheeting web, and is also subjected to a surface-activating treatment. The sheeting webs are then superimposed with laterally offset edges and so that their activated surfaces contact each other and the printed surface of the printed sheeting is covered by an adjacent, unprinted sheeting web. The sheeting webs which are thus superimposed are bonded together by the action of pressure heat. The resulting multi-ply sheeting web having offset edges is formed into a tubing in known manner in that the edges of each sheeting ply are joined by an adhered or heat-sealed, longitudinal seam.

---

Figure 1:
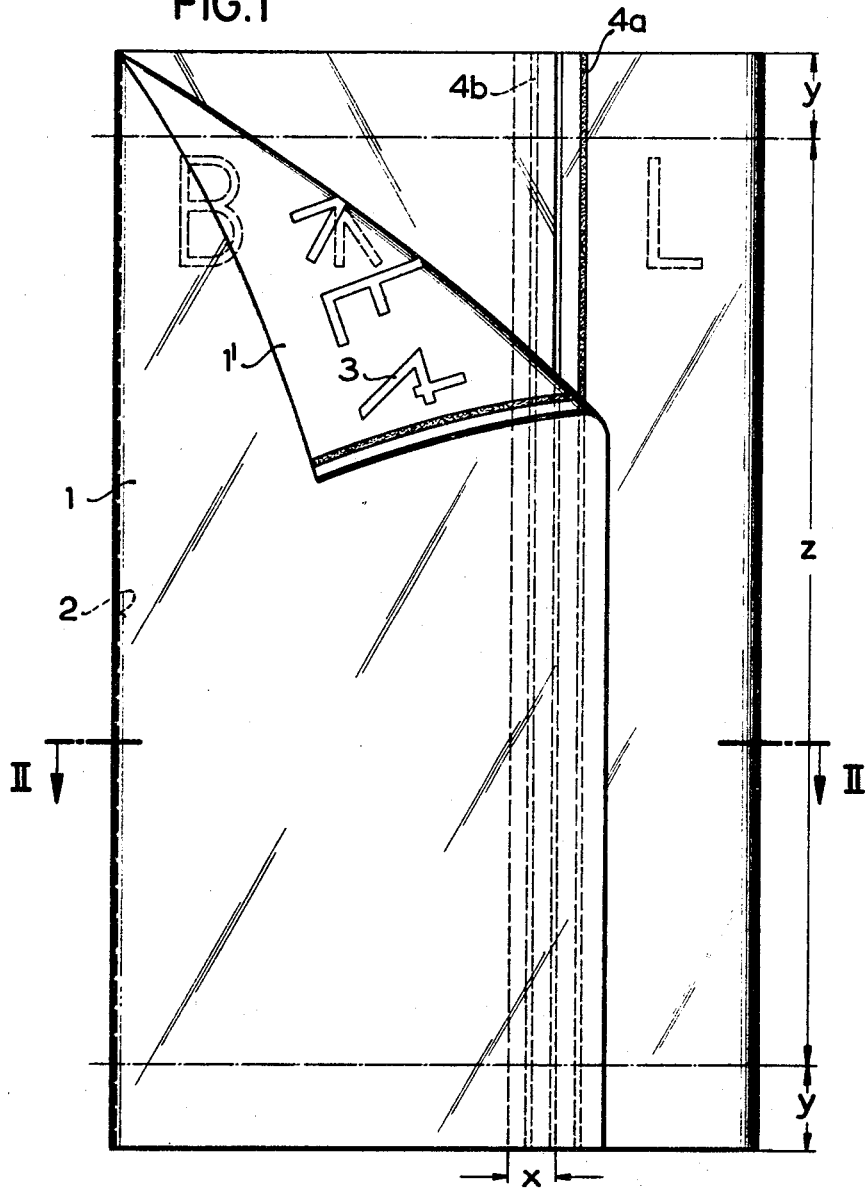

This invention relates to the manufacture of multi-ply tube sections made from at least two webs of plastics material sheeting and intended for use in the manufacture of bags and having an imprint on one of the sheeting surfaces defining an interface between the plies.

The multi-ply tube sections made of plastics material sheeting and used for the manufacture of bags consisted of two plies. The two-ply starting web was made in that an extruded seamless tubing having the required diameter was flattened and trimmed on both sides. A tubing which is more than twice as large in diameter than the desired two-ply tubing is required for this purpose and the high prime costs of the very large extruder needed to make such tubing were tolerated because it was desired to take advantage of the fact that sheeting webs adhere to each other immediately after they have been extruded. A multi-ply tubing of plastics material can be reliably processed to form a bag only if its plies adhere to each other with a sufficiently high bond strength at the ends of the tube section. Otherwise, it is not ensured that the openings of the tube section can be reliably pulled open in the middle between the four plies rather than between three plies on one side and one ply on the other side, when it is desired to form an end closure. A tube section which has thus been improperly pulled open would form a bag which is useless because one side wall of the bag would consist only of one sheeting ply. When the large starting tubing was flattened immediately after it was extruded, when the tubing was still warm, the two sheeting plies adhered to each other as desired. In that process, however, it is not possible to provide an imprint on one of the sheeting surfaces forming an interface between the plies and to laterally offset the sheeting plies so that each ply can be provided with a longitudinal seam to form a closed tube, as is conventional with multi-ply paper bags. In this case, it would be required previously to lift the sheeting plies from each other and to displace them relative to each other. This is impossible, however, because it would destroy the natural bond formed between the sheeting plies immediately after the tubing was extruded.

Because the natural bond established between the sheeting plies must be maintained, the known process of manufacturing multi-ply bags from plastics material sheeting permits of the application of an imprint only on the outside surface of the tubing, where the imprint is fully exposed to the abrasive stresses to which the bag is subjected in use. Besides, the tubing can be closed only by a longitudinal seam which is common to both plies because the two sheeting plies are always superimposed in exact alignment. As a result, a bag made from this tubing has just as a single-ply bag a single longitudinal seam, which must take up the entire load. The use of the known process of manufacturing tubing thus prevents the manufacture of a multi-ply bag in which each ply has a separate longitudinal seam to form said ply into a closed bag so that a maximum strength of the bag is ensured.

It is an object of the invention to provide a process of manufacturing a multi-ply tube section from at least two webs of plastics material sheeting, which tube section can be provided with an imprint on one of the sheeting surfaces forming an interface between the plies, each of said plies having a separate longitudinal seam closing the ply to form a tubing and the plies of the tube section so adhering at the end portions of the tubing that said end portions will always be pulled open in the middle between the superimposed plies.

To accomplish this object, the invention provides a process in which one of the webs of plastics material sheeting is subjected to a known surface-activating treatment on one surface so that the same is adapted to be printed upon, said surface is provided with the desired imprint, which is subsequently thermally dried and cooled thereafter, whereas the other sheeting web or webs is or are heat-treated to cause it or them to assume a condition which corresponds as closely as possible to the condition of the printed sheeting web, and is also subjected to a surface-activating treatment, and the sheeting webs are then superimposed with laterally offset edges and so that their activated surfaces contact each other and the printed surface of the printed sheeting is covered by an adjacent, unprinted sheeting web, the sheeting webs which are thus superimposed are bonded together by the action of pressure and heat and the resulting multi-ply sheeting web having offset edges is formed into a tubing in known manner in that the edges of each sheeting ply are joined by an adhered or heat-sealed, longitudinal seam.

The process is essentially based on the recognition that two sheeting surfaces which have been subjected to a surface-activating treatment, e.g., by a high-frequency spark discharge, and to the action of pressure and heat, adhere to each other just as they do immediately after the extrusion of the sheeting. Because the surfaces will not adhere to each other unless both surfaces have been subjected to the activating treatment, the process may be modified according to the invention in that unprinted sheeting webs are subjected to the surface-activating treatment only in those surface portions which will subsequently form the end portions of the tube sections whereas the surface to be printed upon is entirely subjected to the surface treatment so that it can be printed upon. As a result, the sheeting plies adhere to each other only in the end portions of the tube section, i.e., in the portions which are subsequently folded to form the end closures of the bag, whereas the sheeting plies are loosely superimposed in the printed area which will subsequently form the wall of the bag. In this case, the advantages of providing a plurality of loose plies in the highly stresed wall portion of the bag are fully utilized; these advantages reside in that the bag has a very high flexibility, ultimate tensile stress, and piercing strength.

To form the individual sheeting webs, a flat or circular tubing is extruded, slit on one side and unfolded. In the process according to the invention, each sheeting web must be only as wide as the desired multiply web so that the need for very large extruders such as are required in the known processes is eliminated.

The processes will now be explained more fully with reference to the drawing, in which FIG. 1 shows a two-ply tube section consisting of two plastics material sheetings, one of which is provided with an imprint on its surface forming an interface with the other ply.

Figure 2:
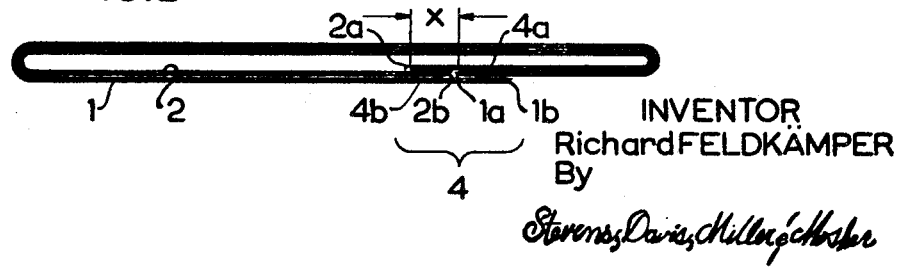

FIG. 2 is a transverse sectional view taken through the tube section on line II—II in FIG. 1 and FIG. 3 is a diagrammatic view showing an apparatus for making two-ply tube sections as shown in FIGS. 1 and 2 and an attachment for use in the manufacture of three-ply tube sections, which attachment is indicated in dash-dot lines.

The tube section shown in FIGS. 1 and 2 consists of two plies 1, 2 of plastics material sheeting. These plies are superimposed and offset by a distance $x$. As a result of a surface-activating treatment and the action of pressure or heat, the confronting surfaces of the two sheeting plies adhere so firmly to each other that the separation of the tube will reliably be effected between the two-ply walls rather than between the sheeting plies of a wall when the end portions of the tube section are pulled open to fold the end closure or to open the filling end portion of the bag made from the tube section.

The outer ply 1 is provided on its inside 1' with the desired imprint 3 in a mirror-inverted arrangement. Because the outer ply is transparent, the imprint is legible from the outside. The two sheeting plies protect the imprint on the inside and outside against any action.

With reference to FIG. 2, each of the sheeting plies 1, 2 has two edges 1a, 1b and 2a, 2b, respectively, which are superimposed to form longitudinal seam lines 4, which are laterally spaced apart by the distance $x$ and where the edge portions are joined by longitudinal seams 4a and 4b, respectively, so that each sheeting ply forms a closed tube. These tubes lie one in the other and are connected only by the bond which is due to the surface-activating treatment. The longitudinal seams 4a, 4b may be made with the aid of a plastics material filament which is introduced between the edge portions of the plies immediately when the filament has been extruded, or by heat sealing or adhering. It will be understood that the plies 1, 2 are tightly superimposed. In FIG. 2, a space is shown between the plies so that the longitudinal seams 4a, 4b can be more clearly seen.

The apparatus shown in solid lines in FIG. 3 serves as a machine for making the two-ply tube sections shown in FIGS. 1 and 2. Two plastics material sheeting webs B1 and B2 used to form the two plastics material sheeting plies 1 and 2 of the tube sections are pulled from the supply rolls 5, 6 and fed to the apparatus and moved through the same at the same speed speed of travel by known means, which are not shown in the drawing and consist, e.g., of feed rolls.

Pretreating units 7, 8 are provided adjacent to the path of travel of the sheeting web B1 to be provided with an imprint. These units 7, 8 subject the sheeting web on that surface which is subsequently to be printed upon to a surface-activating treatment whereby the surface is conditioned to accept the printing ink and to adhere to similarly pretreated sheeting surfaces under the action of pressure and heat. Preferred pretreating units are known devices which subject the surface to be activated to high-frequency spark discharges indicated by the arrows $f$ in the drawing. Viewed in the direction of travel $a$, the pretreating units are succeeded by the printing units 9, 10, which have printing cylinders 11, 12, by which the previously activated surface of the sheeting web B1 is printed upon. The printing units are succeeded by a known hot-air dryer having a plurality of blast heads 13, which blow hot air against the surface which has been printed upon so that the imprint is dried quickly. The temperature of the compressed air discharged by each blast head is selected so that the first blast head, on the left in the drawing, blows very hot air against the printed surfaces of the sheeting which moves past the head, and the following heads direct air streams at lower temperatures against the sheeting surface. The temperature differences between the air streams may be suitably selected. The sheeting web B1 may now be joined to the unprinted sheeting web B2.

A hot-air heater consisting of a multiplicity of blast heads 14 is arranged to act on the path of travel of the unprinted sheeting web B2 and serves to condition the sheeting web B2 as closely as possible to the temperature of the sheeting web B1. The blast heads are controlled in such a manner as to the temperature and/or flow rate of the air to be blown against the sheeting web B2 that the latter assumes a condition which is as close as possible to that of the sheeting web B1 when the imprint on the latter has been dried. Because the two sheeting webs are conditioned alike, no shear stresses will arise therein when they are subsequently joined; such shear stresses would adversely affect the desired bonding of the sheeting webs and could cause a warping of the two-ply sheeting web.

The hot-air heater 14 is preceded or succeeded by a pretreating unit 15, which subjects the sheeting web B2 on that surface which subsequently faces the pretreated and printed surface of the sheeting web B1 to the same surface-activating treatment as the latter. For this reason, the pretreating unit 15 is preferably of the same type as the units 7, 8.

The described units are succeeded in the direction of travel by guiding and reversing rollers 16 and 17, 18, 19, by which the sheeting webs B1 and B2 are supplied to a pair of heated pressure rolls 20, 21. The arrangement of the guiding and reversing rollers is such that the sheeting webs are superimposed with the offset $x$ indicated in FIG. 1 and their activated surfaces contact each other when the sheeting webs are subjected to the action of pressure and heat by the pair of pressure rolls 20, 21. The guiding rolls 16 and 19 are sufficiently spaced from the plane in which the pressure rolls 20, 21 contact each other so that the sheeting webs B1, B2 contact the pressure rolls along arcs defined by the angles $\alpha$ and are sufficiently heated before pressure is applied to the webs by the pressure rolls. The pressure rolls 20, 21 are preferably provided internally with heating chambers, which are flown through by a liquid or gaseous heating fluid. The optimum temperature for a reliable bonding of the sheeting webs is about 80° C. and is imparted to the pair of pressure rolls 20, 21 by the heating fluid. The bonding process will be improved if the action of heat on the sheeting webs is continued after the application of pressure. For this purpose, the two-ply sheeting web B1, B2 is guided to contact one of the pressure rolls over a sufficiently large angle $\beta$ and subsequently runs up on a cooling roll 22, on which it is quickly cooled to room temperature.

The two-ply sheeting web B1, B2, which has been printed upon an inside surface is now formed into a tubing in a tube-laying station 23 of known type. This tubing is provided with the longitudinal seams 4a, 4b (FIGS. 1 and 2), and is subsequently cut into the tube sections S having the desired length. A conveyor 24 feeds the tube sections to a stacking magazine or a succeeding end closure-laying machine.

Additional means for guiding, conditioning and pretreating further sheeting webs may be added to the apparatus which has been described so that a tubing consisting of more than two sheeting webs can also be made without difficulty.

The additional means required when it is desired to make a tubing consisting of three sheeting webs are shown by way of example in FIG. 3. The third sheeting web B3 is taken from the supply roll 25 and just as has been described with reference to the web B2 is pretreated by a hot-air heater 14' and a pretreating unit 15' and guided by the guiding rollers 17', 18', 19' to the pair of pressure rolls 20, 21. As a result, the sheeting web B3 is laterally offset from the sheeting web B2 by the same distance $x$ by which the sheeting web B2 is laterally offset from the sheeting web B1 in FIGS. 1 and 2. As a result, the sheeting web B3 may also be formed into a closed tube by the provision of a separate longitudinal seam. To provide for the desired adhesion between the sheeting webs B2 and B3, the web B2 is activated by an additional pretreating unit 26 acting on that surface of the web B2 which faces the sheeting web B3 and activating said surface as described.

In the apparatus which has been described, the pretreating units 7, 8, 15, 15' and 26 activate the sheeting webs B1, B2, B3 on all surfaces which form interfaces when the sheeting webs have been superimposed so that the sheeting webs of the tubing are bonded together throughout their extent.

As has been explained initially hereinbefore, it is better for the strength of the multi-ply bag if the sheeting plies are loosely superimposed adjacent to the highly stressed bag wall and adhere only in the end portions of the tube sections from which the bottom end closure and the filling opening of the bag are subsequently folded and formed, respectively. To that end, the pretreating units 15, 15' can be energized and de-energized by means of the switch 27 or the like control means. The switch 27 is operated by a cam 28 on the printing unit shaft 29. The cam 28 is angularly adjustable on the printing unit shaft. The top face of the cam 28 determines the time for which the switch 27 is closed and is so dimensioned that the pretreating units 15, 15' are energized during each revolution of the printing cylinder 11 only while the sheeting webs B1, B2, B3 travel a distance $2y$ (FIG. 1), so that the webs B2 and B3 are pretreated by the units 15, 15' only in a web portion having a length $2y$ and in register with the imprint on the web B1. The angular adjustment of the cam 28 enables the zone $2y$ in which the webs B2, B3 are pretreated to be so adjusted relative to the printed web B1 that the pretreated zone fills the area between two imprints of the sheeting web B1 and the sheeting webs are bonded only in that area. Because the tubing shaped in the tube-laying station 23 is cut in register with the imprint, the sheeting plies 1, 2 of the resulting tube sections are bonded together in their portions $y$, i.e., at the ends of the tubing and are loosely superimposed in the portion $z$ provided with the imprint. This is indicated in FIG. 1. The two pretreating units 15, 15' can only be controlled by a common switch 27 and cam 28 if the lengths of the webs B2 and B3 extending between said pretreating units and the pair of pressure rolls 20, 21 are similarly dimensioned to match the tube section length or can be thus dimensioned with the aid of a pivoted roller. It is preferable to provide a separate switch and cam which is associated with each pretreating unit.

What is claimed is:

1. Apparatus for manufacturing multi-ply tube sections made from at least two webs of plastic material sheeting for use in the manufacture of bags having an imprint on one of the sheeting surfaces defining an interface between the plies, comprising a first web, means to direct said web in a path of travel, web surface pretreatment means positioned along said web path, at least one printing unit positioned along said web path, and a hot air dryer for drying the imprint of each said printing unit on said first web, said pretreatment means, each said printing unit and said hot air dryer being arranged along the path of travel of the plastic web material to be printed; at least one other web, means to direct each said other web in a travel path, a controlled air heater positioned along each said other web path, web surface pretreatment means positioned along each said other web path, all of said web paths leading to a plurality of heated pressure rolls, said heated pressure rolls being adapted to superimpose all of said webs and subject them to the action of pressure and heat, and means for forming said pressurized heated superimposed webs into a tube and cutting said tube into individual tube sections.

2. Apparatus according to claim 1 including cooling means positioned along said travel path after said heated pressure rolls.

3. Apparatus according to claim 1 including switch means for energizing and de-energizing said pretreatment means positioned along each said other web.

4. Apparatus according to claim 3 wherein at least one said other web is printed.

5. Apparatus as claimed in claim 1 wherein said hot air dryer and said hot air heater each comprise a housing and a plurality of blast heads connected to said housing, each successive blast head directing an air stream of lower temperature than the previous blast head.

6. Apparatus as claimed in claim 3 wherein each printing unit comprises a shaft, a printing cylinder mounted on said shaft, and an angularly adjustable cam means mounted on said shaft, said cam means serving to control and activate said other web pretreatment means.

7. Apparatus as claimed in claim 6 wherein said cam means is dimensioned so that each said other web pretreatment means is energized during each revolution of said printing cylinder.

8. Apparatus for manufacturing multi-ply tube sections made from at least two webs of plastic material sheeting for use in the manufacture of bags having an imprint on one of the sheeting surfaces defining an interface between the plies, comprising a first web, means to direct said first web in a path of travel, a plurality of pretreatment units positioned along said web path, a pair of printing units positioned along said web path, and a hot air dryer positioned along said web path for drying the imprint of said printing units on said first web; a second web, means to direct said second web in a path of travel, a hot air heater for heating said second web positioned along said second web path, web surface pretreatment means positioned along said second web path, all of said web travel paths leading to a plurality of heated pressure rolls, said heated pressure rolls being adapted to superimpose said first and second webs and subject them to the action of pressure and heat, and means for forming said pressurized heated superimposed webs into a tube and cutting said tube into individual tube sections.

9. Apparatus as claimed in claim 8 including a third web, means to direct said third web in a path of travel, a hot air heater for heating said web positioned along said third web path, a web surface pretreatment unit positioned along the path of travel of said third web, said third web path leading into said heated pressure rolls to be superimposed on said first and second webs.

10. Apparatus as claimed in claim 8 wherein said hot air heater means is adapted to heat said second web to substantially the same temperature as said first web.

References Cited
UNITED STATES PATENTS

| | | | |
|---|---|---|---|
| 2,785,100 | 3/1957 | Yaw | 156—218 |
| 3,160,544 | 12/1964 | May et al. | 156—387 |
| 3,216,885 | 11/1965 | Schaufelberger | 156—387 X |

CARL D. QUARFORTH, Primary Examiner

S. J. LECHERT, Jr., Assistant Examiner

U.S. Cl. X.R.

156—380, 461, 498, 499, 510, 555